(12) United States Patent
Tse et al.

(10) Patent No.: US 8,896,860 B2
(45) Date of Patent: Nov. 25, 2014

(54) METHOD AND APPARATUS FOR TRANSMITTING IMAGE PRODUCTION DEVICE-RELATED INFORMATION TO A REMOTE SERVICE FACILITY

(75) Inventors: Francis Kapo Tse, Rochester, NY (US); Lee D. Roche, Biggleswade (GB)

(73) Assignee: Xerox Corporation, Norwalk, CT (US)

( * ) Notice: Subject to any disclaimer, the term of this patent is extended or adjusted under 35 U.S.C. 154(b) by 1020 days.

(21) Appl. No.: 12/569,308

(22) Filed: Sep. 29, 2009

(65) Prior Publication Data
US 2011/0075194 A1  Mar. 31, 2011

(51) Int. Cl.
G06F 3/12 (2006.01)
H04N 1/00 (2006.01)
H04N 1/32 (2006.01)

(52) U.S. Cl.
CPC ....... *H04N 1/00405* (2013.01); *H04N 1/00076* (2013.01); *H04N 1/00079* (2013.01); *H04N 1/00344* (2013.01); *H04N 1/00477* (2013.01); *H04N 1/00485* (2013.01); *H04N 1/00832* (2013.01); *H04N 1/32625* (2013.01); *H04N 1/32657* (2013.01); *H04N 1/32662* (2013.01); *H04N 2201/0082* (2013.01); *H04N 2201/0091* (2013.01)
USPC .......................................... 358/1.15; 358/1.1

(58) Field of Classification Search
None
See application file for complete search history.

(56) References Cited

U.S. PATENT DOCUMENTS

| 5,051,779 | A | * | 9/1991 | Hikawa .......................... 399/84 |
| 5,207,412 | A | * | 5/1993 | Coons et al. ................. 270/1.02 |
| 5,646,744 | A | | 7/1997 | Knox |
| 6,048,117 | A | | 4/2000 | Banton |
| 6,563,598 | B1 | * | 5/2003 | Johnson et al. .............. 358/1.15 |
| 6,856,432 | B2 | * | 2/2005 | Bobrow et al. ............... 358/402 |
| 6,873,430 | B2 | * | 3/2005 | Grasso et al. ................ 358/1.16 |
| 6,898,625 | B2 | * | 5/2005 | Henry et al. .................. 709/206 |
| 7,287,698 | B2 | * | 10/2007 | Barrus ..................... 235/462.15 |
| 7,460,805 | B2 | | 12/2008 | Adiletta |
| 7,558,983 | B2 | | 7/2009 | Tanimoto |
| 8,065,384 | B2 | * | 11/2011 | Plewnia et al. ............... 709/217 |
| 2005/0023355 | A1 | * | 2/2005 | Barrus ..................... 235/462.15 |
| 2006/0077448 | A1 | * | 4/2006 | Plewnia et al. .............. 358/1.15 |
| 2010/0091313 | A1 | * | 4/2010 | Kitada et al. ................ 358/1.13 |

* cited by examiner

*Primary Examiner* — Marcus T Riley
(74) *Attorney, Agent, or Firm* — Ronald E. Prass, Jr.; Prass LLP (57) ABSTRACT

A method and apparatus for transmitting image production device-related information to a remote service facility is disclosed. The method may include receiving a request to transmit image production device-related information to a remote service facility, image production device-related information being at least one of registration information, diagnostic information, account information, copy count information, alert information, fault information, configuration information, and update information, receiving the image production device-related information, encoding the image production device-related information into one or more machine-readable markings, generating a paper user interface that includes the one or more machine-readable markings, receiving a transmission mode selection, and transmitting the paper user interface to the remote service facility using the selected transmission mode.

15 Claims, 6 Drawing Sheets

| Class Name | Prop Name | Definition | MIB Equivalent |
|---|---|---|---|
| XeroxCIM_Location | | | |
| | PhysicalPosition | Device Location | sysLocation |
| | DeviceID | Device Serial Number | prtgeneralSerialNumber |
| | Name | Device Friendly Name | SysName |
| XeroxCIM_SoftwareElement | | | |
| | Version | Software Version of the System or subsystem | hrSWinstalledName |
| | TargetOperatingSystem | See Appendix A | |
| | SoftwareElementState | 0 - Deployable<br>1 - Installable<br>2 - Executable<br>3 - Running | |
| | Name | Device Model Number | |
| | HostID | Device Serial Number | |
| XeroxCIM_PhysicalElement | | | |
| | Model | Subsystem Model | |
| | Name | Subsystem Description | |
| | HardwareState | Installed<br>Not Installed | |
| XeroxCIM_Service | | | |
| | EnableDefault | Automatic<br>Manual | |
| | ServiceStatus | Deployable<br>Installable<br>Executable<br>Running | |
| | Name | Service Name | |

Xerox WorkCenter 76xx Paper SMart eSolutions Registration

Machine Serial No. : 123456789xx

Instructions
FAX sheet back to Xerox at 1-800-EDGESER

METHOD AND APPARATUS FOR TRANSMITTING IMAGE PRODUCTION DEVICE-RELATED INFORMATION TO A REMOTE SERVICE FACILITY

BACKGROUND

Disclosed herein is a method for transmitting image production device-related information to a remote service facility, as well as corresponding apparatus and computer-readable medium.

In conventional image processing devices, there is a set of services that enable device data to be sent electronically to a device manufacturer or remote service facility for many of the support functions needed for the image processing devices, such as Xerox's® SMart eSolutions™. These functions may include billing, supplies replenishment, diagnostics, engineering analysis and marketing analysis.

However, these electronic processes require the image production device to be connected to the network and be accessed by the remote service facility via either direct communications or a proxy device. Thus, the processes will not work for image production devices that are not connected to the Internet or if they a protected by high-security firewalls.

SUMMARY

A method and apparatus for transmitting image production device-related information to a remote service facility is disclosed. The method may include receiving a request to transmit image production device-related information to a remote service facility, image production device-related information being at least one of registration information, diagnostic information, account information, copy count information, alert information, fault information, configuration information, and update information, receiving the image production device-related information, encoding the image production device-related information into one or more machine-readable markings, generating a paper user interface that includes the one or more machine-readable markings, receiving a transmission mode selection, and transmitting the paper user interface to the remote service facility using the selected transmission mode.

DETAILED DESCRIPTION

Aspects of the embodiments disclosed herein relate to a method for transmitting image production device-related information to a remote service facility, as well as corresponding apparatus and computer-readable medium.

The disclosed embodiments may include a method for transmitting image production device-related information to a remote service facility. The method may include receiving a request to transmit image production device-related information to a remote service facility, image production device-related information being at least one of registration information, diagnostic information, account information, copy count information, alert information, fault information, configuration information, and update information, receiving the image production device-related information, encoding the image production device-related information into one or more machine-readable markings, generating a paper user interface that includes the one or more machine-readable markings, receiving a transmission mode selection, and transmitting the paper user interface to the remote service facility using the selected transmission mode.

The disclosed embodiments may further include an image production device that may include a communication interface that facilitates transmissions from the image production device, and a paper user interface generator that receives a request to transmit image production device-related information to a remote service facility, receives the image production device-related information, encodes the image production device-related information into one or more machine-readable markings, generates a paper user interface that includes the one or more machine-readable markings, receives a transmission mode selection, and transmits the paper user interface using the communication interface to the remote service facility using the selected transmission mode, wherein the image production device-related information is at least one of registration information, diagnostic information, account information, copy count information, alert information, fault information, configuration information, and update information.

The disclosed embodiments may further include a computer-readable medium storing instructions for controlling a computing device for transmitting image production device-related information to a remote service facility. The instructions may include receiving a request to transmit image production device-related information to a remote service facility, image production device-related information being at least one of registration information, diagnostic information, account information, copy count information, alert information, fault information, configuration information, and update information, receiving the image production device-related information, encoding the image production device-related information into one or more machine-readable markings, generating a paper user interface that includes the one or more machine-readable markings, receiving a transmission mode selection, and transmitting the paper user interface to the remote service facility using the selected transmission mode.

The disclosed embodiments may concern a method and apparatus for transmitting image production device-related information to a remote service facility in an image production device. The disclosed embodiments may utilize machine-readable markings on paper user interfaces to provide image production device data. The machine-readable markings may be DataGlyphs®, for example, which are encoded marks and that meet basic security requirements because these markings cannot be read by humans looking at the hardcopy. Additionally, the data can be encrypted with a private key or other security measures to provide another level of security in the unlikely case there that the DataGlyph® encoding has been reverse engineered.

This process provides the following advantages:

Machine-readable markings are robust and encrypted as marks on paper

Writing and reading of machine readable markings is currently built into image production devices All image production devices have the build-in generator (printer) and reader (scanner) for paper user interfaces, such as Xerox'® SMart Paper™

The paper user interface can be transmitted by facsimile ("fax"), email, shipped with the machine, etc.

The paper user interface is a printed page that all image production devices can generate Physical generation of a paper user interface can be by-passed if the paper user interface is directly faxed by the image production device (or other fax device) to the manufacturer or remote service facility The paper user interface of the disclosed embodiments may address many image production device support-related functions. As examples, two processes that directly correspond to current networked support-supplier (e.g., SMart eSolutions™) functions may be performed:

Registering the image production device with a manufacturer or remote service provider/facility (e.g., Xerox®) (this could be done as a part of the paper user interface scanning to set up machine).

Submit data back to the manufacturer or remote service provider/facility.

These processes are described below specifically with respect to FIGS. 5 and 6, respectfully, for example.

Another support-related function addressed by the paper user interface of the disclosed embodiments may be a process that provides a way of aiding a user in troubleshooting and diagnosing problems real-time with assistance from the manufacturer or remote service provider/facility, such as the current SMart eSolutions™ service, called Service Assistance™). The same image production device information, device fault and printer alert data for maintenance processes may be stored and used. The troubleshooting process may be initiated on-demand by the image production device user and the up-to-date and/or archived data may be sent to the remote service facility where a Xerox® customer service representative may be able to analyze it and guide the user through diagnosing and correcting device problems.

Currently, there are two ways to initiate the troubleshooting/diagnostic functions and both must be accomplished through a communications network using the user interface at the image production device. These current functions may be supplemented with the paper user interface process of the disclosed embodiments where the user can go to a page on the local user interface and select to output all maintenance assistant data for fax or e-mail back to manufacturer or remote service provider/facility either through hardcopy of direct fax. Thus, the paper user interface described in the disclosed embodiments may provide a cost effective and convenient way for data gathering services on image production devices without network connections.

Figure 1:
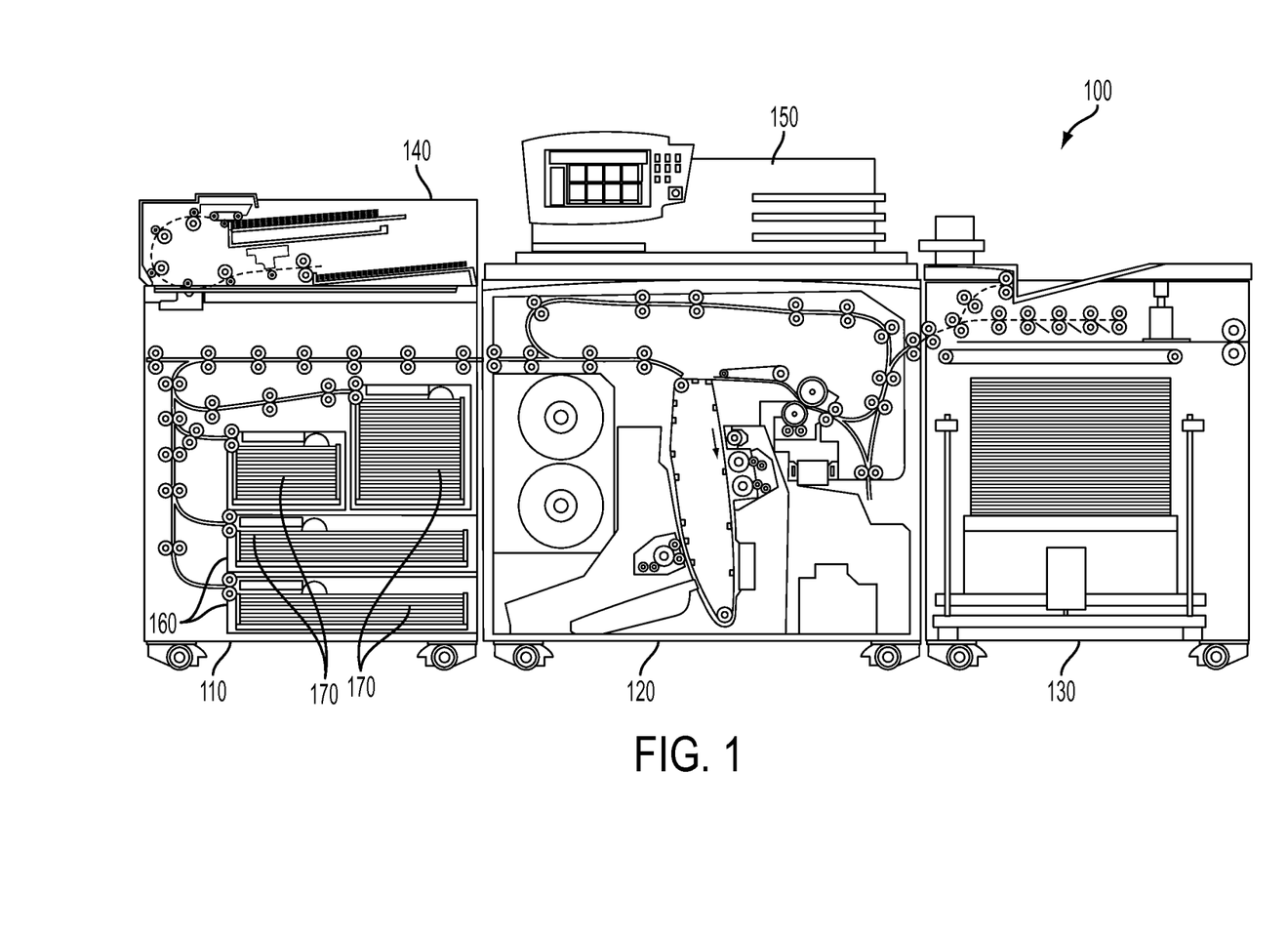
FIG. 1 is an exemplary diagram of an image production device in accordance with one possible embodiment of the disclosure.

FIG. 1 is an exemplary diagram of an image production device 100 in accordance with one possible embodiment of the disclosure. The image production device 100 may be any device or combination of devices that may be capable of making image production documents (e.g., printed documents, copies, etc.) including a copier, a printer, a facsimile device, and a multi-function device (MFD), for example.

The image production device 100 may include an image production section 120, which includes hardware by which image signals are used to create a desired image, as well as a stand-alone feeder section 110, which stores and dispenses sheets on which images are to be printed, and an output section 130, which may include hardware for stacking, folding, stapling, binding, etc., prints which are output from the marking engine. If the image production device 100 is also operable as a copier, the image production device 100 may further includes a document feeder 140, which operates to convert signals from light reflected from original hard-copy image into digital signals, which are in turn processed to create copies with the image production section 120. The image production device 100 may also include a local user interface 150 for controlling its operations, although another source of image data and instructions may include any number of computers to which the printer is connected via a network.

With reference to feeder section 110, the section may include any number of trays 160, each of which stores a media stack 170 or print sheets ("media") of a predetermined type (size, weight, color, coating, transparency, etc.) and may include a feeder to dispense one of the sheets therein as instructed. Certain types of media may require special handling in order to be dispensed properly. For example, heavier or larger media may desirably be drawn from a media stack 170 by use of an air knife, fluffer, vacuum grip or other application (not shown in the Figure) of air pressure toward the top sheet or sheets in a media stack 170. Certain types of coated media may be advantageously drawn from a media stack 170 by the use of an application of heat, such as by a stream of hot air (not shown in the Figure). Sheets of media drawn from a media stack 170 on a selected tray 160 may then be moved to the image production section 120 to receive one or more images thereon. Then, the printed sheet is then moved to output section 130, where it may be collated, stapled, folded, punched, etc., with other media sheets in manners familiar in the art.

Figure 2:
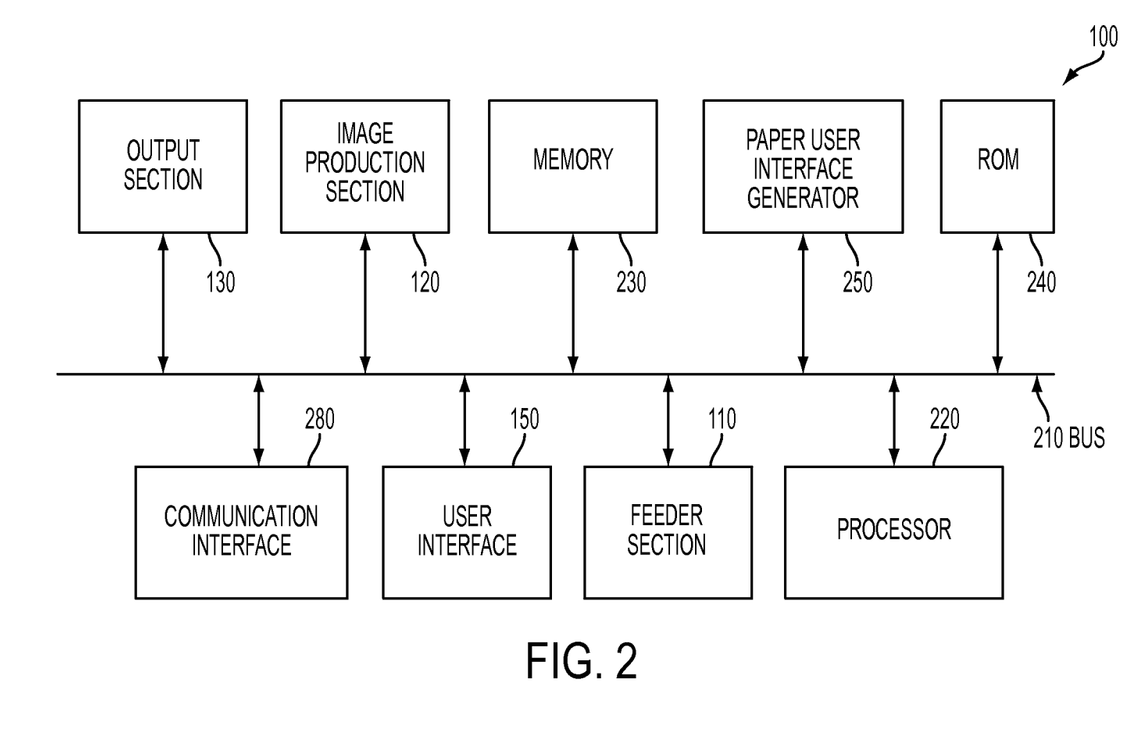
FIG. 2 is a exemplary block diagram of the image production device in accordance with one possible embodiment of the disclosure.

FIG. 2 is an exemplary block diagram of the image production device 100 in accordance with one possible embodiment of the disclosure. The image production device 100 may include a bus 210, a processor 220, a memory 230, a read only memory (ROM) 240, a paper user interface generator 250, a feeder section 110, an output section 130, a user interface 150, a communication interface 280, and an image production section 120. Bus 210 may permit communication among the components of the image production device 100.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

User interface 150 may include one or more conventional mechanisms that permit a user to input information to and interact with the image production unit 100, such as a keyboard, a display, a mouse, a pen, a voice recognition device, touchpad, buttons, etc., for example. Output section 130 may include one or more conventional mechanisms that output image production documents to the user, including output trays, output paths, finishing section, etc., for example. The image production section 120 may include an image printing and/or copying section, a scanner, a fuser, etc., for example. The scanner may be any device that may scan documents and may create electronic images from the scanned document. The scanner may also scan, recognize, and decipher marking-readable codes or makings, for example.

The image production device 100 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The image production device 100 illustrated in FIGS. 1-2 and the related discussion are intended to provide a brief, general description of a suitable communication and processing environment in which the disclosure may be implemented. Although not required, the disclosure will be described, at least in part, in the general context of computer-executable instructions, such as program modules, being executed by the image production device 100, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like that are capable of displaying the print release marking and can be scanned by the image production device.

The operation of components of the paper user interface generator 250 and the image production device-related information transmission process will be discussed in relation to the flowchart in FIG. 3.

Figure 3:
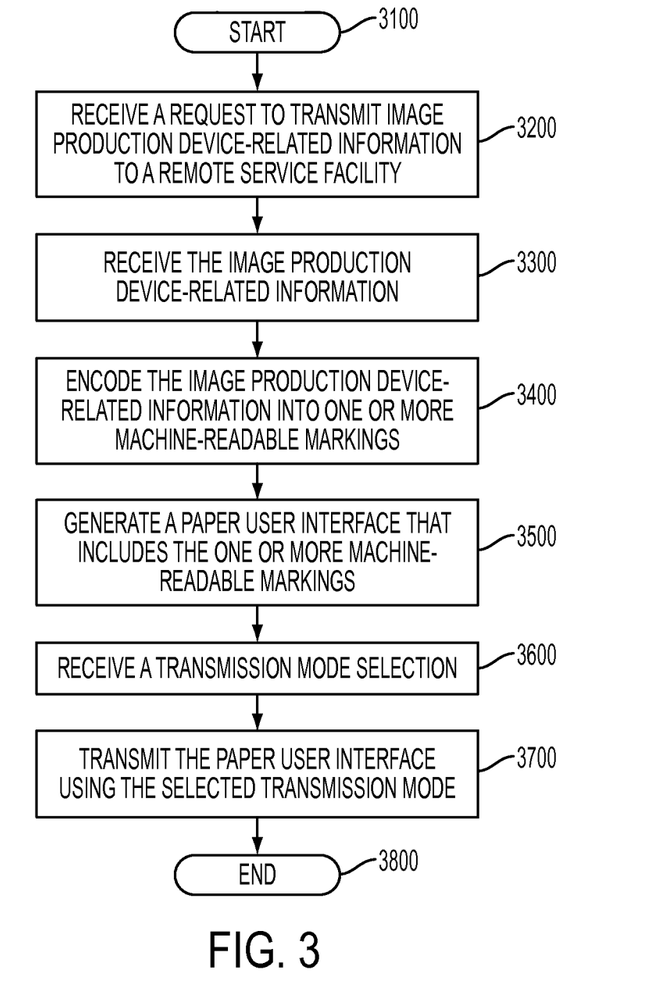
FIG. 3 is a flowchart of an exemplary image production device-related information transmission process in accordance with one possible embodiment of the disclosure.

FIG. 3 is a flowchart of an exemplary image production device-related information transmission process in accordance with one possible embodiment of the disclosure. The method begins at step 3100, and continues to step 3200 where the paper user interface generator 250 may receive a request to transmit image production device-related information to a remote service facility. The image production device-related information may be registration information, diagnostic information, account information, copy count information, alert information, fault information, configuration information, or update information, for example.

At step 3300, the paper user interface generator 250 may receive the image production device-related information. The image production device-related information may be information stored in memory 230 or it may be generated by the image production device 100, for example. At step 3400, the paper user interface generator 250 may encode the image production device-related information into one or more machine-readable markings. The one or more machine-readable markings may be any one, two, or three-dimensional machine-readable marking, such as a one-dimensional bar code, a two-dimensional bar code, a three-dimensional bar code, or a data glyph, for example. In addition, machine-readable markings may also include markings that may be read by optical character recognition (OCR), for example.

At step 3500, the paper user interface generator 250 may generate a paper user interface that includes the one or more machine-readable markings, At step 3600, the paper user interface generator 250 may receive a transmission mode selection. The selected transmission mode may be either e-mail or fax over a telephone line (assuming that network connections such as the Internet are unavailable). Note that the telephone line may be any analog, digital, or voice-suitable telephone line through any wired or wireless medium, etc. (e.g., wire, cable, air, etc.). Note also that an intermediate device (computer, server, fax machine, image production device, portable digital assistant (PDA), etc.) may be used to relay the paper user interface to a transmission device for transmission or to an output device to output the paper user interface for printing and faxing, emailing, etc.

At step 3700, the paper user interface generator 250 may transmit the paper user interface using the communication interface 280 to the remote service facility using the selected transmission mode. Note that the selection transmission mode may include having the paper user interface generator 250 print the paper user interface so it may be faxed by the user or automatically faxed by the image production device if that capability exists and is operating. The process may then go to step 3600 and end.

The paper user interface generator 250 may receive a receipt that the transmission was received by the remote service facility. This receipt may be received by e-mail or return fax, for example.

Figure 4:
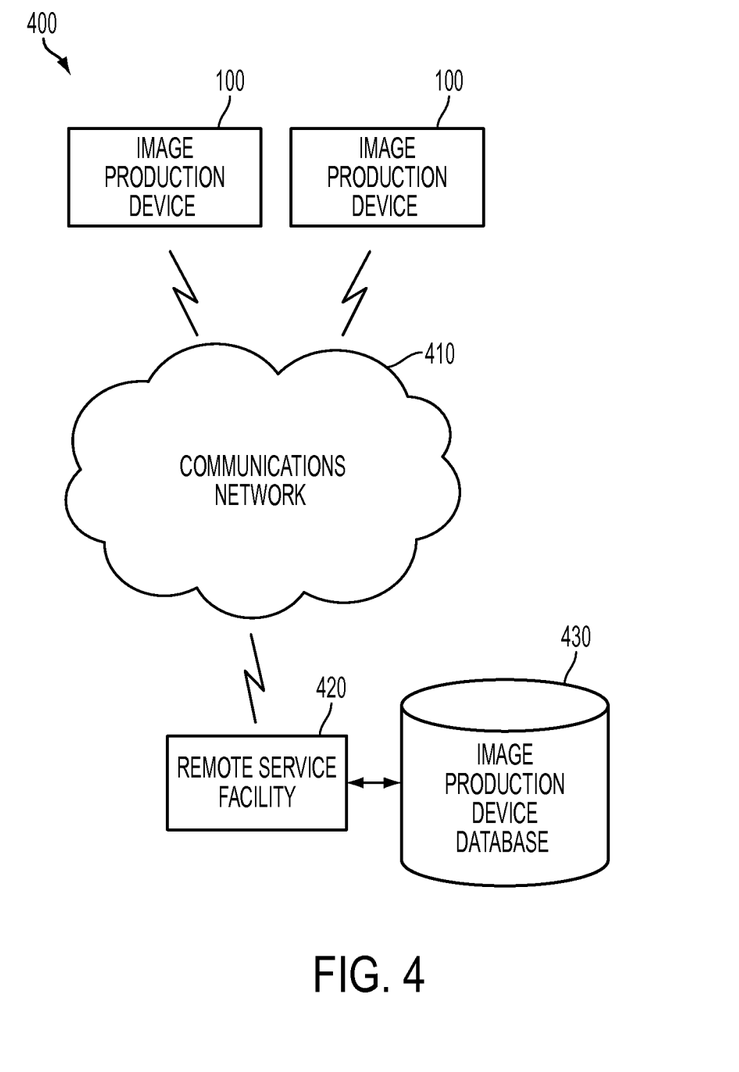
FIG. 4 is an exemplary image production device-related information transmission environment in accordance with one possible embodiment of the disclosure.

FIG. 4 is an exemplary image production device-related information transmission environment 400 in accordance with one possible embodiment of the disclosure. The exemplary image production device-related information transmission environment 400 may include one or more image production devices 100, and one or more remote service facilities 420, which may communicate by fax or e-mail through a communications network 410. If a network, such as the Internet is not available or firewalled, faxing or e-mail may be performed through telephone communication using a wired or wireless telephone phone line. The fax or e-mail may include an attachment, such as the paper user interface which may be in a common format, such as a word processing document, PDF, etc., for example. Note that in this instance, the word processing document, PDF, etc. may be considered electronic data relating to a picture of the machine-readable markings which contain the image processing device-related information.

As such, the communications network 110 may represent any communication and/or media network, such as the Internet, intranet, telephone network, cable television network, satellite television network, satellite radio network or any other network system known to one of skill in the art that may be able to transmit wired or wireless fax and e-mail transmissions, for example, to transmit the paper user interface image to the remote service facility 420. Note that if an e-mail is received, the paper user interface may be in an attachment, such as a PDF, for example.

The remote service facility 420 may represent the original equipment manufacturer (OEM) or service representative for the image production device 100. The remote service facility 420 may include one or more processing devices, such as a computer, server, etc., that may be able to communicate with the image production device 100 and may be able to process faxes and e-mails the include paper user interfaces from the device 100. Alternatively, faxes and e-mails may be received by one communication device (e.g., fax, computer, etc.) and input to another processing device by transmission or scanning, for example. The processing devices at the remote service facility 420 may be able to decode the machine-readable markings on the paper user interface into text, audio, etc., that was previously encoded and transmitted by the image production device 100, for example.

The remote service facility 420 may also include an image production device database 430 that may include stored information on the type of image production device 100, such as for device/service registration, diagnostic, set-up, maintenance purposes, etc. In addition, the image production device database 430 may also include stored information related to individual image production devices 100 owned or leased by users. This information may be organized by image production device 100 serial numbers and may be linked to user profiles and service profile information, for example. The encoded device serial number on the paper user interface may cause the stored image production device-related information to be called up from the image production device database 430 by the processing device at the remote service facility 420 in order to process a service problem/request, for example. The image production device database 430 may archive maintenance and diagnostic information on the individual or collective image production devices 100, as well FIG. 5 is an exemplary paper user interface for image production device registration 500 in accordance with one possible embodiment of the disclosure. The exemplary paper user interface for image production device registration 500 may include the image production device 100 ("machine") serial number 510, general image production device information 530, faxing or e-mail instructions 530, and one or more machine-readable markings 540 with specific encoded image production device information. The one or more machine-readable markings 540 may be any one, two, or three-dimensional machine-readable marking, such as a one-dimensional bar code, a two-dimensional bar code, a three-dimensional bar code, or a data glyph, for example. In addition, the machine-readable markings 540 may also include markings that may be read by optical character recognition (OCR), for example. The one or more machine-readable markings 540 may be located on predetermined portions of an image or a media sheet so that they may be more easily identified and read by an image processing device or other processing device.

Registration of the device with the remote service facility 420 may include the following process:

1) A user may enter the image production device 100 registration paper user interface generation screen on the user interface 150.

2) On the local user interface 150, the user may select a registration method. This method may include: a) printing out a hardcopy of the paper user interface 500 to be faxed back to the remote service facility 420; or b) faxing the paper user interface registration sheet 500 directly to the remote service facility 420 (if the faxing capability is available on the device); or c) print out a hardcopy of the paper user interface 500 and e-mailing or faxing the digitized paper user interface registration sheet 500 to the remote service facility 420 (if the e-mailing capability is available through a telephone line on the device). User can elect any suitable ways to digitize the paper user interface 500 via scanning or photograph with an appropriate digital camera, for example.

3) On the local user interface 150, the user may select the method of how he/she can be informed of registration success or failure. This method may include: a) Via email (may be required to enter or select the e-mail address); b) Via automated confirmation phone call from the remote service facility 420; or c) Via return fax to the image production device 100 from the remote service facility 420 (if faxing capability is available on the device).

4) The user may select to perform registration via the method selected in step 2.

5) If the fax method selected in step 2, the user may fax the paper user interface 500 to the remote service facility 420 using the image production device 100 or a separate fax machine/device.

Note that the hardcopy of the paper user interface registration sheet 500 may also be sent with the image production device 100 as part of device setup package and instructions.

This process may allow the image production device 100 to register for participation in maintenance and service programs provided by the remote service provider 420, such as Xerox'® Paper SMart eSolutions™. This registration information may be sent to the remote service facility 420 and may contain the device 100 serial number 510, product identification 520, and encoded information specific to the image production device 100 in the form of one or more machine readable markings 540, as well as an XML data stream indicating the software and hardware configuration of the device 100, for example.

Figure 5:
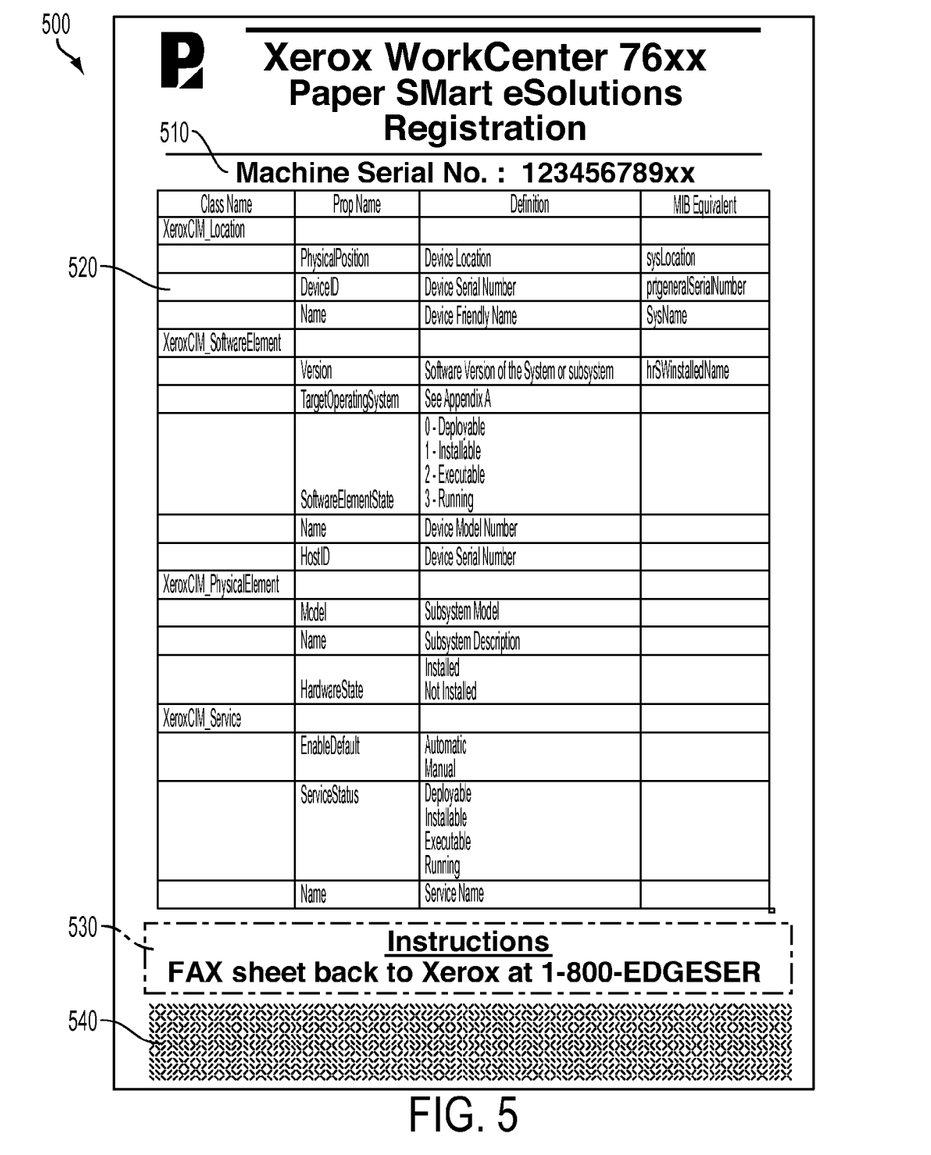
FIG. 5 is an exemplary paper user interface for image production device registration in accordance with one possible embodiment of the disclosure.

Please note that that the paper user interface 500 shown in FIG. 5 is merely illustrative. Details and other information may be added and the design may be modified as long as the paper user interface identification mechanism (such as the logo shown on upper left hand corner) and area for the machine-readable markings 540 is included.

Figure 6:
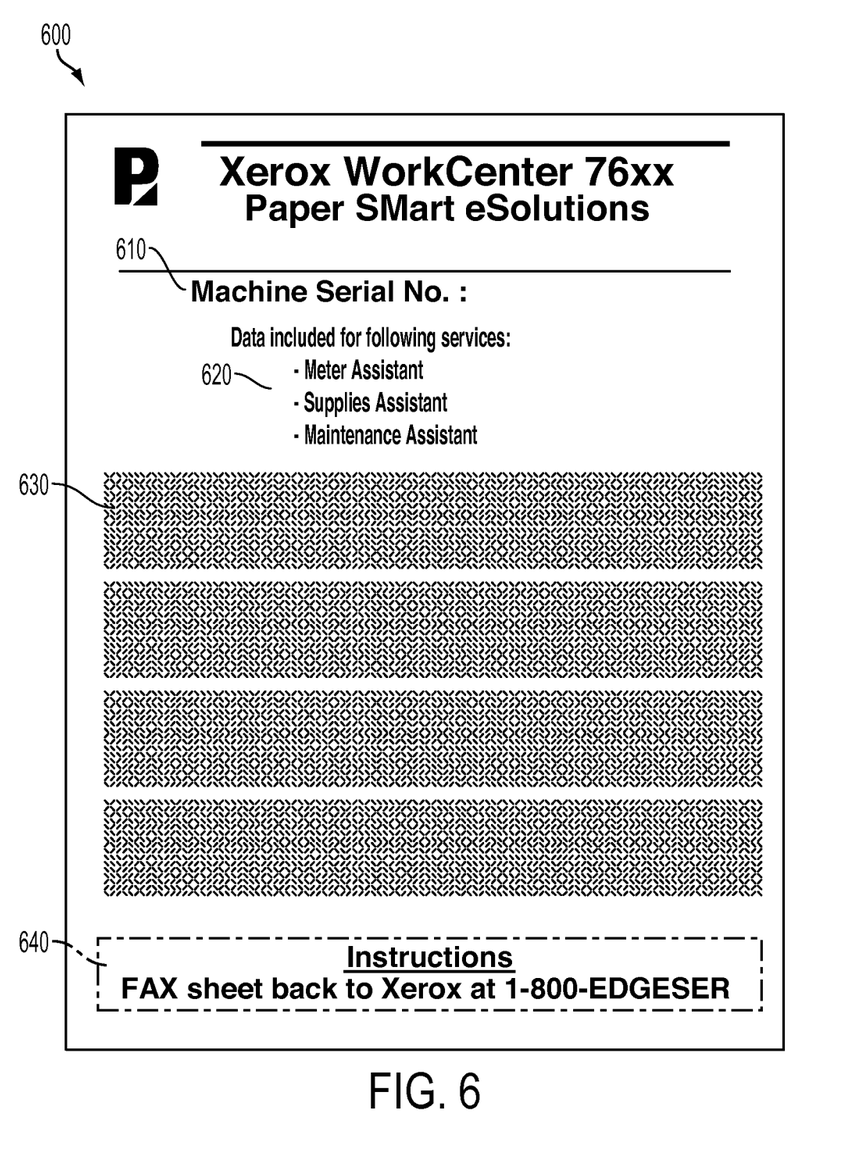
FIG. 6 is an exemplary paper user interface for image production device service in accordance with one possible embodiment of the disclosure.

FIG. 6 is an exemplary paper user interface for image production device service 600 in accordance with one possible embodiment of the disclosure. The exemplary paper user interface for image production device service 600 may include the image production device 100 ("machine") serial number 610, general image production device service information 620, one or more machine-readable markings 630 with specific encoded image production device information, and faxing or e-mail instructions 640. This process may be used to submit image production device 100 usage and maintenance data back to the remote service facility 420 on a regular basis. The process may include the following steps:

1) The user may enter the paper user interface generation screen on the user interface 150.

2) The user may select one or more services that may be desired. These services may include metering, supplies, maintenance requests, data (which may include usage counters, imaging counters, tray usages, pixels, area coverage, etc.), device faults, printer alerts, update configurations or software, diagnostic checks, etc. This selected information may then be encoded into machine-readable markings 630.

3) The user may select a mode of transmission of data. This process may include:

a) saving the settings so that the same information is sent to the remote service facility 420 each time; b) printing out a hardcopy of the paper user interface 600 to be emailed or faxed to the remote service facility 420; c) having the image production device 100 fax the paper user interface 600 to the remote service facility 420 (if the faxing capability is available on the device 100); and d) setting up a scheduled paper user interface 600 transmission (this may involve setting up an e-mail reminder to print out and fax the paper user interface 600, and/or having the image production device 100 directly fax the paper user interface 600 sheet to the remote service facility 420 at designated time periods (if fax capability is available on the device 100) and a copy of the fax may be printed on the image production device 100 for user's records).

Please note that that the paper user interface 600 shown in FIG. 6 is merely illustrative. Details and other information may be added and the design may be modified as long as the paper user interface identification mechanism (such as the logo shown on upper left hand corner) and area for the machine-readable markings 630 is included. Also, the machine-readable markings 630 are shown on a single page only. Depending on the total amount of data that needs to be transmitted back to the remote service facility 420, more than one page of paper user interface 600 could be used.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein. It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for providing image production device-related information to a remote service facility, comprising:
   maintaining the image production device-related information in a memory at an image production device, wherein the image production device-related information is selected from a group consisting of at least one of registration information, diagnostic information, account information, copy count information, alert information, fault information, configuration information, and update information;
   upon receiving a request for the image production device-related information automatically causing a processor to read the image production device-related information from the memory at the image production device;
   causing the processor to encode the image production device-related information read from the memory in the image production device into one or more machine-readable markings, wherein the one or more machine-readable markings may be any one, two, or three-dimensional marking;
   generating with the processor in the image production device a paper user interface by printing the one or more machine-readable markings representing the encoded received image production device-related information on an image receiving media substrate as a printed page generated by the image production device; and
   outputting from the image production device the generated printed page that is the paper user interface with the one or more machine-readable markings representing the encoded received image production device-related information printed thereon;
   transmitting, using a selected transmission mode, the paper user interface using a communication interface at the image production device to a remote service facility.

2. The method of claim 1, wherein the one or more machine-readable markings printed on the generated printed page that is the paper user interface are at least one of a one-dimensional bar code, a two-dimensional bar code, a three-dimensional bar code, and markings that may be read by optical character recognition (OCR).

3. The method of claim 1, further comprising:
   receiving with the processor in the image production device a transmission mode selection; and
   transmitting the paper user interface to the remote service facility using a transmission mode indicated by the received transmission mode selection.

4. The method of claim 1, wherein the one or more machine-readable markings are printed only on predetermined portions of an image of the generated printed page on the image receiving medium substrate.

5. The method of claim 1, wherein the image production device is one of a copier, a printer, a facsimile device, and a multi-function device.

6. An image production device, comprising:
   a processor coupled to a memory to maintain image production device-related information, wherein the image production device-related information is selected from a group consisting of at least one of registration information, diagnostic information, account information, copy count information, alert information, fault information, configuration information, and update information;
   a communication interface that facilitates one of email or facsimile transmissions from the image production device; and
   a paper user interface generator that generates a printed page by printing images on an image receiving medium substrate in the image production device the paper user interface generator being programmed to:
   upon receiving a request for the image production device-related information automatically causing the processor to read the image production device-related information from the memory,
   cause the processor to encode the image production device-related information read from the memory in the image production device into one or more machine-readable markings, wherein the one or more machine-readable markings may be any one, two, or three-dimensional marking, cause the processor to generate a paper user interface by printing the one or more machine-readable markings representing the encoded received image production device-related information on the image receiving media substrate as the printed page in the image production device, receive a transmission mode selection, the transmission mode selection being one of an email transmission and a facsimile transmission; and transmit using the selected transmission mode the paper user interface generated as the printed page with the one or more machine-readable markings representing the encoded received image production device-related information printed thereon using a communication interface at the image production device to the remote service facility.

7. The image production device of claim 6, wherein the one or more machine-readable markings printed on the generated printed page that is the paper user interface are at least one of a one-dimensional bar code, a two-dimensional bar code, a three-dimensional bar code, and markings that may be read by optical character recognition (OCR).

8. The image production device of claim 6, wherein the one or more machine-readable markings are printed only on predetermined portions of an image printed on the image receiving medium substrate.

9. The image production device of claim 6, wherein the image production device is one of a copier, a printer, a facsimile device, and a multi-function device.

10. A non-transitory computer-readable medium storing instructions for controlling a computing device in an image production device that, when executed by the computing device, cause the image production device to execute steps of a method for providing image production device-related information to a remote service facility, the method comprising:

maintaining the image production device-related information in a memory at an image production device, wherein the image production device-related information is selected from a group consisting of at least one of registration information, diagnostic information, account information, copy count information, alert information, fault information, configuration information, and update information;

upon receiving a request for the image production device-related information automatically causing a processor to read the image production device-related information from the memory in the image production device;

causing the processor to encode the image production device-related information read from the memory in the image production device into one or more machine-readable markings, wherein the one or more machine-readable markings may be any one, two, or three-dimensional marking;

generating in the image production device a paper user interface by printing the one or more machine-readable markings representing the encoded received image production device-related information on an image receiving media substrate as a printed page generated by the image production device;

outputting from the image production device the generated printed page that is the paper user interface with the one or more machine-readable markings representing the encoded received image production device-related information printed thereon; and transmitting to a remote service facility by using a selected transmission mode the paper user interface using a communication interface at the image production device.

11. The non-transitory computer-readable medium of claim 10, further comprising:

receiving in the image production a transmission mode selection that is one of an email transmission and a facsimile transmission; and transmitting the paper user interface to the remote service facility using a transmission mode indicated by the received transmission mode selection.

12. The non-transitory computer-readable medium of claim 10, wherein the one or more machine-readable markings printed on the generated printed page that is the paper user interface are at least one of a one-dimensional bar code, a two-dimensional bar code, a three-dimensional bar code, and markings that may be read by optical character recognition (OCR).

13. The non-transitory computer-readable medium of claim 10, wherein the one or more machine-readable markings are printed only on predetermined portions of an image printed on the image receiving medium substrate.

14. The non-transitory computer-readable medium of claim 10, wherein the image production device is one of a copier, a printer, a facsimile device, and a multi-function device.

15. The method of claim 3, wherein the transmission mode is one of an email transmission or a facsimile transmission.

* * * * *